United States Patent
Ayalasomayajula et al.

(10) Patent No.: US 10,063,776 B2
(45) Date of Patent: Aug. 28, 2018

(54) CAMERA MODE CONTROL

(71) Applicant: GoPro, Inc., San Mateo, CA (US)

(72) Inventors: Shishir Rao Ayalasomayajula, Cupertino, CA (US); Ravi Kumar Belagutti Shivanandappa, Santa Clara, CA (US); Anandhakumar Chinnaiyan, Fremont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/142,943

(22) Filed: Apr. 29, 2016

(65) Prior Publication Data

US 2016/0323508 A1 Nov. 3, 2016

Related U.S. Application Data

(60) Provisional application No. 62/155,882, filed on May 1, 2015.

(51) Int. Cl.
*H04N 5/232* (2006.01)
*H04N 5/783* (2006.01)
(Continued)

(52) U.S. Cl.
CPC ..... *H04N 5/23245* (2013.01); *H04N 5/23241* (2013.01); *H04N 5/23254* (2013.01);
(Continued)

(58) Field of Classification Search
CPC ...... H04N 5/2322; H04N 5/772; H04N 5/783; H04N 19/10; H04N 5/23241; H04N 5/23254; H04N 5/23258; H04N 9/8211
(Continued)

(56) References Cited

U.S. PATENT DOCUMENTS

2005/0030387 A1 2/2005 Pilu
2005/0285941 A1 12/2005 Haigh
(Continued)

OTHER PUBLICATIONS

PCT International Search Report and Written Opinion for PCT/US16130183, dated Aug. 8, 2016, 13 Pages.
(Continued)

*Primary Examiner* — Nhan T Tran
(74) *Attorney, Agent, or Firm* — Young Basile Hanlon & MacFarlane, P.C.

(57) ABSTRACT

Cameras may monitor its operation and automatically switch between operation modes thereby to best capture users' experiences. Auxiliary sensor data collected by the one or more sensors and/or captured image data may be analyzed to determine when a camera should switch to a different operation mode. The auxiliary sensor data and/or the content of the captured images may include motion information indicating whether the camera or the captured scene has relatively high-motion, relatively low-motion, or no motion. Event(s) may be detected by analyzing the auxiliary sensor data and/or analyzing captured image data, and preferred operation mode(s) suitable for capturing the events can be determined. Each preferred operation mode may be associated with a confidence value. A camera may switch to a preferred operation mode for capturing an event if the event is determined with high confidence to take place at a time point.

25 Claims, 7 Drawing Sheets

(51) Int. Cl.
*H04N 5/77* (2006.01)
*H04N 9/82* (2006.01)

(52) U.S. Cl.
CPC ......... *H04N 5/23258* (2013.01); *H04N 5/772* (2013.01); *H04N 5/783* (2013.01); *H04N 9/8211* (2013.01)

(58) Field of Classification Search
USPC .............................. 348/207.99, 208.1, 208.2
See application file for complete search history.

(56) References Cited

U.S. PATENT DOCUMENTS

| | | | |
|---|---|---|---|
| 2006/0061666 A1 | 3/2006 | Kaneko | |
| 2007/0104462 A1* | 5/2007 | Saito | H04N 19/503 386/329 |
| 2008/0149723 A1 | 6/2008 | Zhu et al. | |
| 2009/0087016 A1* | 4/2009 | Berestov | H04N 5/57 382/100 |
| 2009/0263021 A1* | 10/2009 | Takamori | H04N 5/144 382/181 |
| 2010/0182442 A1 | 7/2010 | Maeng | |
| 2010/0265344 A1 | 10/2010 | Velarde | |
| 2013/0027581 A1* | 1/2013 | Price | H04N 5/2351 348/229.1 |
| 2013/0242120 A1 | 9/2013 | Venkatraman | |
| 2013/0286250 A1 | 10/2013 | Kumar et al. | |

OTHER PUBLICATIONS

Supplementay European Search Report dated Mar. 15, 2018 for EP 1678984 (9 pages).

* cited by examiner

CAMERA MODE CONTROL

CROSS-REFERENCE TO RELATED APPLICATION(S)

This application claims priority under 35 U.S.C. § 119(e) to U.S. Provisional Patent Application Ser. No. 62/155,882, "Camera Mode Control," filed May 1, 2015, which is incorporated herein by reference in its entirety.

BACKGROUND

Technical Field

This disclosure relates to a camera, and more specifically, to automatically controlling an operation mode of a camera.

Description of the Related Art

Most capture devices allow for a variety of options and configurations for capturing image, video, and audio content. For example, a capture device can be configured to capture a single image, a time-lapsed burst of multiple images, or video captured at varying frames per second (e.g., 24 frames per second (fps), 30 fps, 120 fps, 240 fps, etc.) In a conventional capture device, a user manually selects a specific operation mode for capturing content. For action cameras used during activities such as skiing, snowboarding, surfing, biking, etc., users often do not have direct access to the camera or are otherwise focused on the activities during the image or video capture. Users are often not in a position to switch camera operation modes at the right time to optimize capturing the experience. In one representative example scenario, a skier has cameras mounted on his helmet and his skis. The skier sets up both cameras when starting his ski run, and at some point during his run, makes a jump. The user would like to capture this jump with the ski-mounted camera taking a burst of multiple images and the helmet-mounted camera taking a high frame rate capture (for slow motion effect), but the user is unable to manually switch either of the cameras to the desired modes in the middle of the ski run. Thus, conventional camera systems fail to provide any mechanism for automatically determining and switching to an operation mode that best captures a user experience.

BRIEF DESCRIPTION OF THE DRAWINGS

The teachings of the present disclosure can be readily understood by considering the following detailed description in conjunction with the accompanying drawings.

Figure 1:
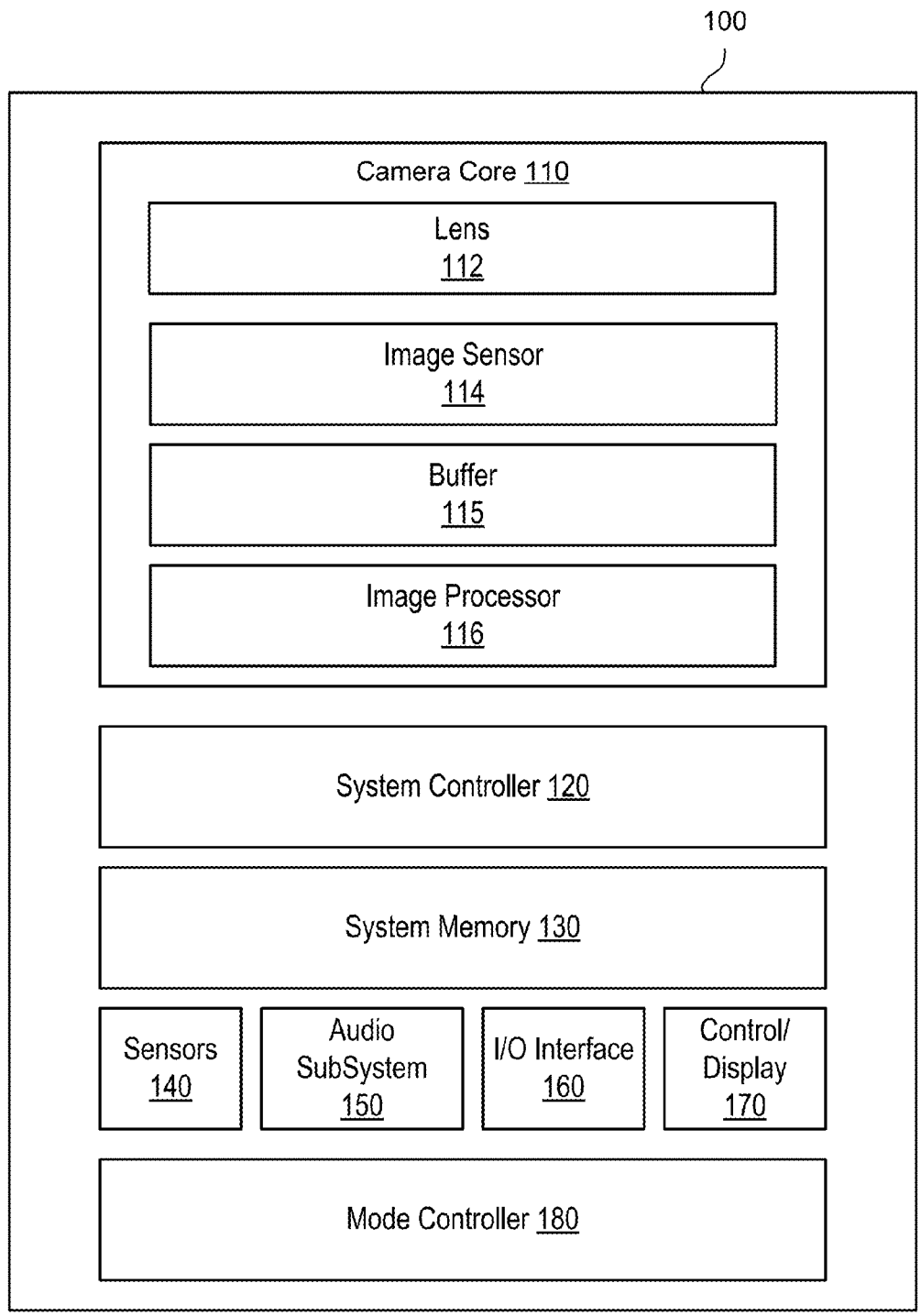
FIG. 1 is a block diagram illustrating a camera, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Cameras may monitor its operation and automatically switch between operation modes thereby to best capture users' experiences. Auxiliary sensor data collected by the one or more sensors and/or captured image data may be analyzed to determine when a camera should switch to a different operation mode. The auxiliary sensor data and/or the content of the captured images may include motion information indicating whether the camera or the captured scene has relatively high-motion, relatively low-motion, or no motion. Different events may require the camera to operate at different operation modes to ensure image quality and minimize artifacts to best capture users' experiences. Event(s) may be detected by analyzing the auxiliary sensor data and/or analyzing captured image data, and preferred operation mode(s) suitable for capturing the events can be determined. Each preferred operation mode may be associated with a confidence value. A camera may switch to a preferred operation mode for capturing an event if the event is determined with high confidence to take place at a time point.

In one embodiment, a method controls operation of a camera includes receiving, from one or more sensors of the camera, sensor data. A confidence value associated with an alternative operation mode for operating the camera is determined based at least in part on the received sensor data. The confidence value indicates a likelihood of the alternative operation mode being preferred by a user to capture an event. While the camera is operating in an initial operation mode in which an image sensor captures images according to an initial capture mode and an image processor reads the captured images from a buffer of the camera and encodes the captured images according to an initial encoding mode: responsive to determining that the confidence value exceeds a first threshold, the camera is transitioned to a priming operation mode. In the priming operation mode, the image sensor captures images according to an alternative capture mode and the image processor reads the captured images from the buffer of the camera and encodes the captured images according to the initial encoding mode. While the camera operating in the priming operation mode, responsive to determining that the confidence value subsequently drops below the first threshold transitioning the camera to the initial operation mode.

In one embodiment, a camera includes one or more sensors to generate sensor data. The camera further includes an image sensor to capture images according to different capture modes including an initial operation mode and an alternative operation mode, a buffer to store the captured images, and an image processor to read the captured images from the buffer and to encode the captured images according to different encoding modes including an initial encoding mode and an alternative encoding mode. The camera further includes a mode controller to receive the sensor data from the one or more sensors and to determine a confidence value associated with an alternative operation mode for operating the camera based at least in part on the received sensor data, the confidence value indicating a likelihood of the alternative operation mode being preferred by a user to capture an event. While the camera is operating in an initial operation mode in which the image sensor captures images according to the initial capture mode and the image processor reads the captured images from the buffer of the camera and encodes the captured images according to the initial encoding mode, the mode controller transitions the camera to a priming operation mode responsive to determining that the confidence value exceeds a first threshold. In the priming operation mode, the image sensor captures images according to an alternative capture mode and the image processor reads the captured images from the buffer of the camera and encodes the captured images according to the initial encoding mode. While the camera operating in the priming operation mode, the mode controller transitions the camera to the initial operation mode responsive to determining that the confidence value subsequently drops below the first threshold.

In one embodiment, a system includes a processor and a non-transitory memory coupled to the processor. The memory store instructions configured to cause the processor to receive, from one or more sensors of the camera, sensor data. A confidence value associated with an alternative operation mode for operating the camera is determined based at least in part on the received sensor data, the confidence value indicating a likelihood of the alternative operation mode being preferred by a user to capture an event. While the camera is operating in an initial operation mode in which an image sensor captures images according to an initial capture mode and an image processor reads the captured images from a buffer of the camera and encodes the captured images according to an initial encoding mode: responsive to determining that the confidence value exceeds a first threshold, the camera is transitioned to a priming operation mode. In the priming operation mode, the image sensor captures images according to an alternative capture mode and the image processor reads the captured images from the buffer of the camera and encodes the captured images according to the initial encoding mode. While the camera operating in the priming operation mode, responsive to determining that the confidence value subsequently drops below the first threshold transitioning the camera to the initial operation mode.

Example Camera Configuration

FIG. 1 is a block diagram illustrating a camera 100, according to one embodiment. In the illustrated embodiment, the camera 100 comprises a camera core 110 comprising a lens 112, an image sensor 114, and an image processor 116. The camera 100 additional includes a system controller 120 (e.g., a microcontroller or microprocessor) that controls the operation and functionality of the camera 130 and system memory 130 configured to store executable computer instructions that, when executed by the system controller 120 and/or the image processor 116, perform the camera functionalities described herein. In some embodiments, a camera 130 may include multiple camera cores 110 to capture fields of view in different directions which may then be stitched together to form a cohesive image. For example, in an embodiment of a spherical camera system, the camera 130 may include two camera cores 110 each having a hemispherical or hyperhemispherical lens that each captures a hemispherical or hyperhemispherical field of view which are stitched together in post-processing to form a spherical image.

The lens 112 can be, for example, a wide angle lens, hemispherical, or hyperhemispherical lens that focuses light entering the lens to the image sensor 114 which captures images and/or video frames. In different configurable operation modes, the image sensor 114 may capture high-definition images having a resolution of, for example, 3 Mp (megapixels), 5 Mp, 7 Mp, 8 Mp, 12 Mp, or higher or high-definition video having resolutions of 720 p, 1080 p, 4 k, or higher. In a burst image capture mode, the image sensor 114 may capture a burst of multiple images at frame rates of, for example, 3 fps (frames per second), 5 fps, 8 fps, 10 fps or higher. In different configurable operation modes, the image sensor 114 may capture video frames at frame rates of, for example, 24 fps, 30 fps, 60 fps, 120 fps, 240 fps, or higher. The image processor 116 encodes the captured image data, for example, by performing one or more image processing functions of the captured image data. For example, the image processor 116 may perform a Bayer transformation, demosaicing, noise reduction, image sharpening, image stabilization, rolling shutter artifact reduction, color space conversion, compression, or other in-camera processing functions. Processed image data may be temporarily or persistently stored to system memory 130 and/or to a non-volatile storage, which may be in the form of internal storage or an external memory card. In one embodiment, image data captured by the image sensor 114 is temporarily stored to a buffer 115. The image processor 116 reads the image data from the buffer 115 and encodes the captured image data. Thus, the encoding lags behind capture by a time period dependent on the processing times and the length of the buffer 115.

Sensors 140 capture various sensor data concurrently with, or independently of, image or video capture. The sensor data may be stored in association with the captured image or video data as metadata. For example, the sensors 140 may capture time-stamped location information based on a global positioning system (GPS) sensor, and/or an altimeter. Other sensors 140 may be used to detect and capture orientation of the camera 100 including, for example, an orientation sensor, an accelerometer, a gyroscope, or a magnetometer. Other sensors 140 may be used to detect and capture biometric information relating to a camera user or subject of the capture such as, for example, pulse data. Sensor data captured from the various sensors 140 may be processed to generate other types of metadata. For example, sensor data from the accelerometer may be used to generate motion metadata, comprising velocity and/or acceleration vectors representative of motion of the camera 100. Furthermore, sensor data from the orientation sensor may be used to generate orientation metadata describing the orientation of the camera 100. Sensor data from the GPS sensor provides GPS coordinates identifying the location of the camera 100, and the altimeter measures the altitude of the camera 100. In one embodiment, the sensors 140 are rigidly coupled to the camera 100 such that any motion, orientation, or change in location experienced by the camera 100 is also experienced by the sensors 140. Alternatively, sensors 140 may be remote from the camera 100 and affixed to an object of interest that is a subject of the image or video capture (e.g., a bike, surfboard, vehicle, etc.). In an embodiment, the sensors 140 may be integrated with a mobile device carried by the user that can communicate wirelessly with the camera 100 to provide the sensor data. In yet another embodiment, sensors may be integrated with an aerial vehicle on which the camera 100 is mounted. The sensors 140 furthermore may associate a time stamp representing when the data was captured by each sensor. In one embodiment, the sensors 140 automatically begin collecting sensor data when the camera 100 begins capturing an image or recording a video.

An audio subsystem 150 includes, for example, one or more microphones and one or more audio processors to capture and process audio data correlated with video capture. In one embodiment, the audio subsystem 150 includes a microphone array having two or microphones arranged to obtain directional audio signals.

An input/output (I/O) interface 160 transmits and receives data from various external devices. For example, the I/O interface 160 may facilitate the receiving or transmitting video or audio information through an I/O port. Examples of I/O ports or interfaces include USB ports, HDMI ports, Ethernet ports, audioports, and the like. Furthermore, embodiments of the I/O interface 160 may include wireless ports that can accommodate wireless connections. Examples of wireless ports include Bluetooth, Wireless USB, Near Field Communication (NFC), and the like. The I/O interface 160 may also include an interface to synchronize the camera 100 with other cameras or with other external devices, such as a remote control, a second camera, a smartphone, a client device, or a video server.

A control/display subsystem 170 includes various control and display components associated with operation of the camera 100 including, for example, LED lights, a display, buttons, microphones, speakers, and the like.

A mode controller 180 may control the camera 100 (and optionally one or more additional cameras) to automatically switch between operation modes for best capturing a user's experience. When operating in different operation modes, the camera 100 may generate images and/or videos having different properties. For example, the camera may capture images at different resolutions (e.g., 18 Mp (megapixel), 14 Mp, 12 Mp, 8 Mp, 7 Mp, 5 Mp, 3 Mp, etc.), or capture a series of images captured at different rates (e.g., 3 fps (frames per second), 5 fps, 8 fps, 10 fps, 20 fps, etc.). Furthermore, video may be captured using different formats, frame rates (e.g., 240 fps (frames per second), 120 fps, 60 fps, 30 fps, etc.) and/or resolutions (e.g., 1080 p, 730 p, 4K, etc.) Other camera function such as aperture, shutter speed, exposure level, color correction, rolling shutter correction, etc. may also be automatically controlled. Different events may make it desirable for the camera to operate at different operation modes to ensure image quality, prevent artifacts, or introduce desired cinematic effects into the video. Events may be detected by analyzing the auxiliary sensor data, content of the captured images and audio, control inputs (e.g., button presses, voice commands, gesture commands, etc.) detected by the camera, predefined user preferences, camera state information (e.g., a current configuration of the camera), physical capabilities of the camera, or a combination of other data collected by the mode controller 180. Then, one or more operation modes best suitable for capturing the event can be predicted. For example, the auxiliary sensor data and/or the content of the captured images and audio may include motion information indicating whether the camera or the captured scene has relatively high-motion, relatively low-motion, or no motion. The motion history may be used to predict future motion that is likely to take place and change the operation mode accordingly. For example, if the mode controller 180 detects a trend of increasing velocity, it may predict that the motion will continue to increase and switch to a higher frame rate to enable a slow motion effect during playback. In another example, using location information, the mode controller 180 may predict when the camera is entering or has entered a geographic area of interest. In yet another example, the mode controller 180 analyzes biometric data from a user and changes a camera mode in response to detecting an increased pulse rate. In one embodiment, the mode controller 180 continuously analyzes the various types of input data and generates a confidence score indicating a likelihood of a particular event occurring for which it would be desirable to trigger a mode change. In yet another example, the mode controller 180 may switch operation modes in response to a button press or control signal, either by itself or in combination with other inputs.

In one embodiment, the operation mode may be determined based at least in part on the quantity of image sensors 114 and/or image processors 116 available in a camera 100. For example, in a two camera arrangement, the mode controller 180 may determine that a 4 k video mode is the preferred mode of operation, but only one of the two cameras has that capability. Thus, a different operation mode (e.g., 1080 p) may be selected for the camera lacking the 4 k capability.

The mode controller 180 may switch the camera 100 to a determined operation mode for capturing an event if the event is determined to take place with high confidence (e.g., above a threshold confidence score). The mode controller 180 may be integrated with the camera 100 as illustrated or external to the camera 100. For example, the mode controller 180 may be integrated with an external mobile device or remote control that wireless communicates with the camera. In another embodiment, the mode controller 180 may be integrated with a mounting platform such as a handheld grip, a rotating mount, or an aerial vehicle that communicates with and controls operation of the camera 100. In one embodiment, the mode controller 180 (integrated with the camera 100 or external to the camera 100) may control operations of at least two or more cameras. Here, mode switching of multiple cameras may be coordinated in order to produce desired cinematic effects when the content is combined in post-processing.

The different possible operation modes of one or more cameras that the mode controller 180 selects between and the criteria for switching between the modes may be preconfigured or selectable by the user. Furthermore, if the mode controller 180 controls multiple cameras 100, the mode for each camera 100 at a given time may be different and the criteria for switching between camera modes in each camera 100 may be different. For example, a user may configure various predefined modes having a combination of settings (e.g., resolution, frame rate, burst mode (e.g., the number of images captured within a second), or a particular camera, etc.) for capturing events of different types.

Figure 2:
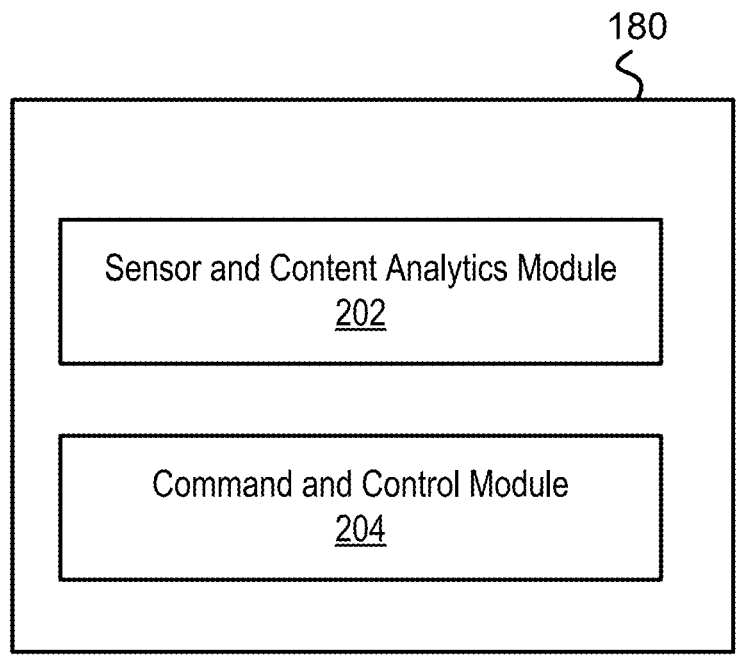
FIG. 2 is a block diagram illustrating a camera mode controller, according to one embodiment.

FIG. 2 is a block diagram illustrating a camera mode controller 180, according to one embodiment. The camera mode controller 180 comprises a sensor and content analytics module 202, and a command and control module 204. The sensor and content analytics module 202 analyzes auxiliary data, image content, audio content, control inputs, or other input data and determines preferred operation modes for operating one or more cameras. The command and control module 204 controls operations of the one or more cameras 100 based on the operation mode determined by the sensor and content analytics module 202. For example, the command and control module 204 regulates operations of the image sensor 114, image processor 116, or other components of the camera 100 according to the operation modes determined by the sensor analytics module 202. More details of determining operation modes and regulating a camera's operation according to the determined operation modes are provided below with respect to FIGS. 3-5.

Camera Mode Control

Figure 3:
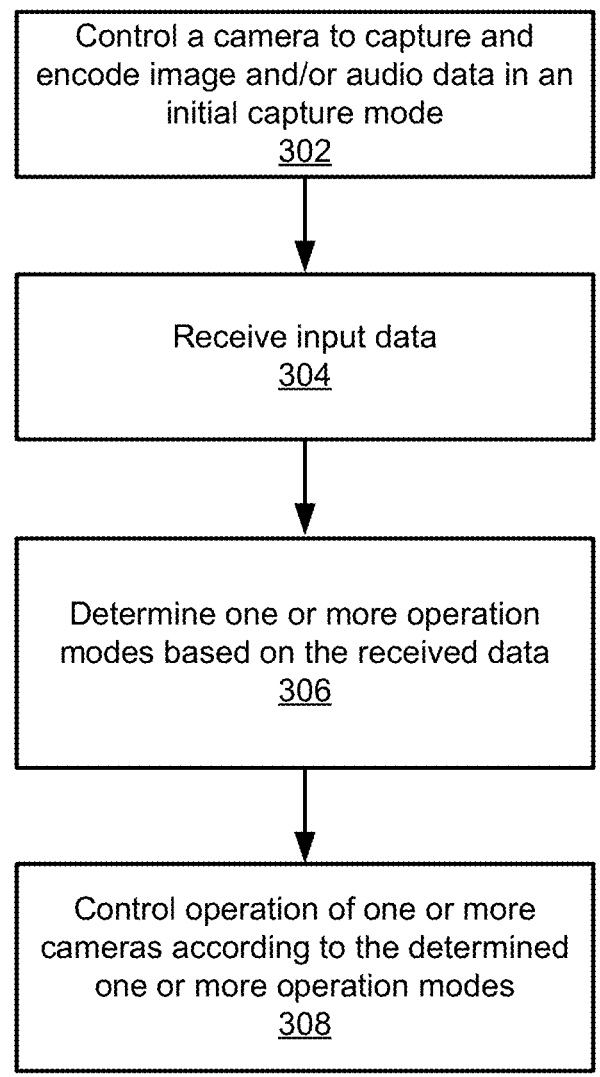
FIG. 3 is a flow chart illustrating a camera switching between operation modes based on auxiliary sensor data, according to one embodiment.

FIG. 3 is a flow chart illustrating an embodiment of a process for switching a camera between operation modes, according to one embodiment. A mode controller 180 controls a camera 100 to operate 302 in an initial operation mode in which its image sensor(s) capture images according to the initial operation mode and its image processor(s) encode images (or video frames) according to the initial operation mode.

The camera 100 receives 304 input data, which may include sensor data from one or more sensors 140 (e.g., motion information, location information, biometric information, temperature, proximity to other cameras, etc.), the audio/visual data captured by the camera 100, one or more control inputs (e.g., a button press, voice command, gesture command, etc.), user preferences, camera state information (e.g., a current operation mode of the camera 100), physical capabilities of the camera, or a combination of these or other factors. The mode controller 180 (e.g., the sensor analytics module 202) determines one or more operation modes for operating the camera 100 based at least in part on the received data. For example, in one embodiment, the mode controller 180 determines scores for a plurality of different possible operating modes based on the received data and generates a ranked list of operating modes. The ordered operation mode(s) may represent a ranking of the operation modes most likely to be desired by the user to operate the camera to capture the events determined based on the received input data. The sensor and content analytics module 202 may analyze the received input data to detect events or likelihood of events that are taking place. In one embodiment, the sensor and content analytics module 202 may determine a confidence value associated with an event representing a likelihood of the event taking place. For example, the sensor and content analytics module 202 determines a velocity of the camera 100 by dividing the distance between the locations of the last and current time stamps over the time duration between the last and current time stamps. An acceleration of the camera 100 may be determined by dividing the velocities of the last and current time stamps over the time duration between the last and current time stamps. The sensor and content analytics module 202 determines that an increase in acceleration when the acceleration is above a threshold acceleration indicates a high-motion event and assigns a high confidence value to the high-motion event. In addition, the sensor and content analytics module 202 may further assign a low confidence value to a mid-motion event or a low-motion event. As one example, an increase in acceleration above a threshold acceleration may indicate a skier approaching a jump, which is a high-motion event. In another example, the confidence value may increase with increasing pulse rate. In yet another example, the confidence value may increase with increasing altitude or as the user approaches a location of interest. In yet another embodiment, the confidence value may be set to a first value when a voice or gesture command is first detected, and set to a second higher value when the voice or gesture command is confirmed.

In one embodiment, the mode controller 180 receives a n-dimension sensor input, and classifies the received sensor input into K possible camera operation mode clusters. Correlations between K possible camera operation modes and a range of n dimensional sensor vectors are evaluated by a classifier. The classifier is trained by using a training sample set of input videos and the corresponding operation modes. Given a particular N dimensional input sensor array $\{S(0) \ldots S(n)\}$, its distance from each of the K possible operation modes is calculated. The distances can be represented by a vector $\{d(0) \ldots d(k)\}$ and normalized such that $Dn(i)=d(i)/Sum(d(0) \ldots d(k))$.

The inverse of $Dn(i)$ measures how strongly the sensor vector correlates with a particular camera mode K. The operation modes are further filtered and rescored based on the camera's state such as the camera's battery health, temperature, and other parameters. The operation mode with the strongest score is selected for determining a first threshold value $TH_1$ and a second threshold value $TH_2$. The threshold values $TH_1$ and $TH_2$ measure how far apart the strongest score is with respect to the median.

In further embodiments, the confidence value can be based on other input data or a combination of different types of input data. In a multi-camera arrangement, different operation modes may be determined for different cameras based on the received input data.

One or more cameras' operation is controlled 308 according to the determined operation mode(s). Here, the command and control module 204 may generate 310 an output to control operations of the camera 100 or generate a control signal to cause one or more external devices (e.g., another camera, camera accessory, or mount platform) according to the determined operation mode. The mode controller 180 receives sensor input from all cameras involved in the multicamera control and calculates operation modes for all the cameras. For each operation mode $X(i)$, a camera $C(i)$ is assigned such that the sensor vector $V(i)$ that corresponds to the camera is most strongly correlated with the operation mode $X(i)$, compared to the other cameras.

Control of Capture Frame Rate

Figure 4:
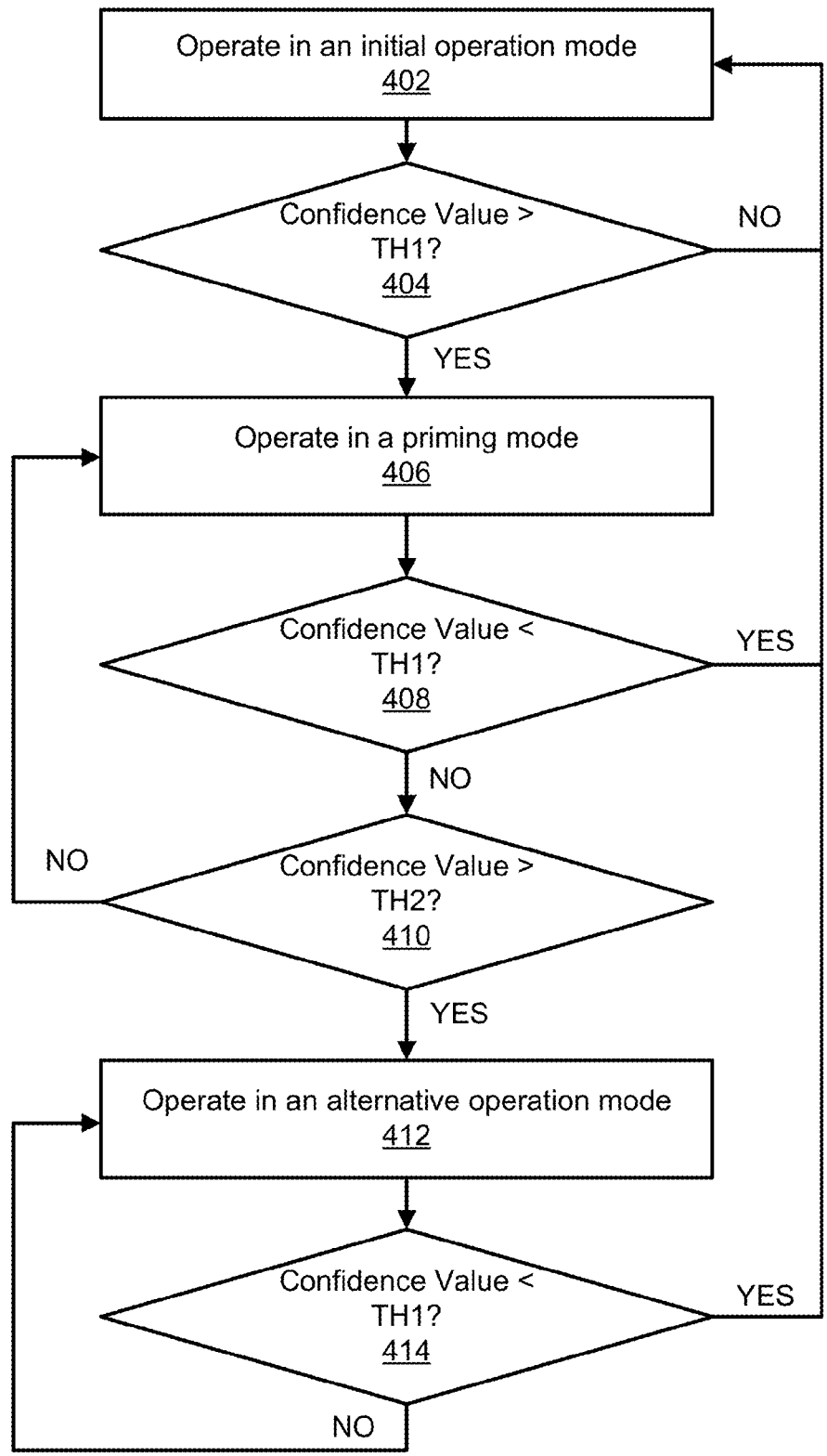
FIG. 4 is a flow chart illustrating an example process for switching a camera between operating modes including an initial operation mode, a priming operation mode, and an alternative operation mode, according to one embodiment.

FIG. 4 is a flow chart illustrating an example process for switching a camera between operating modes including an initial operation mode, a priming operation mode, and an alternative operation mode, according to one embodiment. In this embodiment, the initial operating mode represents, for example, a standard frame rate capture mode (e.g., 30 frames per second) in which the image sensor 114 captures images at the standard frame rate, stores the frames to a buffer 115, and the image processor 116 reads the frames from the buffer 115 and encodes the frames at the standard frame rate. The alternative operating mode represents, for example, a high frame rate capture mode (e.g., 60 fps). The priming mode represents a mode in which the image sensor 114 operates at the high frame rate (e.g., 60 fps) but the image processor 116 encodes the images at the standard frame rate (e.g., 30 fps). The priming mode is generally used as a transitional mode between the initial mode and the alternative mode, the advantages of which will be described in further detail below.

Operations of the image sensor 114 and the image processor 116 are controlled in this example embodiment by generating confidence values associated with an event for which a high frame rate capture is desirable. For example, a higher confidence value may be generated as the acceleration or velocity increases, as altitude increases, as pulse rate increases, as a location of interest is approached, as input commands are received, or based on a combination of these or other factors.

In some embodiments, operation of the image processor 116 may be controlled to track the operation of the image sensor 114. The operation of the image sensor is controlled based on the determined confidence value associated with an event for which a high frame rate capture is desirable. The image processor 116 is controlled to delay switching its operation by a predetermined duration (e.g., n seconds of buffer size) subsequent to the image sensor 114 switching its operation. The predetermined duration is a time period the image processor 116 needs to encode buffered data. This mechanism accounts for the delay in evaluating that such a moment has occurred since the measurements and analysis are performed on events that have already occurred. This enables the camera to apply the new encoding configuration retroactively on buffered data.

The high frame rate event may possibly not take place after the camera switching to the priming mode. To save the battery life, the camera 100 may transition back to the initial operation mode at a predetermined time duration (e.g., n seconds of buffer size) subsequent to switching the image sensor 114 to operate at the alternative operation mode, responsive to determining that the confidence value is still greater than a first value but less than a second higher value. Furthermore, in one embodiment, a user can provide explicit input by means of voice or gesture or a button press, etc., indicating that an event is about to occur that would warrant switching to a different operation mode.

A camera operates 402 in the standard frame rate mode in which the camera captures and encodes image data according to baseline settings that may be user-defined or hard coded. While operating in the baseline frame rate mode, the camera determines confidence values associated with transitioning to the high frame rate mode based at least in part on sensor data received from sensors, the image or video content, control signals, or other input data. The high frame rate mode may be a user-defined or hard coded frame rate higher than the standard frame rate.

While operating in the standard frame rate mode, the camera compares 404 the determined confidence value to a first threshold value $TH_1$. Responsive to determining that the confidence value is below the first threshold value $TH_1$, the camera continues to operate in the standard frame rate mode. Responsive to determining that the confidence value exceeds the first threshold $TH_1$, the camera switches to operate 406 in the priming mode. While operating in the priming mode, the image processor 116 encodes, according to the standard frame rate mode (e.g., encoding at 30 fps), the buffered data that is captured according to the high frame rate mode (e.g., captured at 60 fps or 120 fps). While operating in the priming operation mode, the camera compares 408 a determined confidence value to the first threshold value $TH_1$. The camera transitions back to the standard frame rate mode responsive to determining that the determined confidence value falls below the first threshold value $TH_1$.

The camera also compares 410 the determined confidence value to a second threshold value $TH_2$ and continues to operate in the priming operation mode responsive to determining that the confidence value does not exceed the second threshold value $TH_2$. The camera transitions to operating 412 in the high frame rate mode responsive to determining that the confidence value exceeds the second threshold. Here, the image sensor 114 continues to operate according to the high frame rate mode and the image processor 116 switches to operate according to the high frame rate mode. Because the encoding lags behind the image capture (due to the buffering of the captured frames), the image processor may either begin encoding at the high frame rate after it completes encoding the already buffered frames at the low frame rate mode, or the image processor may encode all or some of the buffered frames at the high frame rate. While operating in the high frame rate mode, the camera continues to generate confidence values and compares 414 the confidence values to the first threshold value $TH_1$. The camera transitions back to the standard frame rate mode responsive to determining the confidence value drops below the first threshold value $TH_1$. The image sensor switches to operate according to the low frame rate mode responsive to determining that the confidence value drops below the first threshold. The image processor may switch to operate according to the standard frame rate mode after completing encoding of the already buffered frames at the high frame rate mode, or the image processor may encode all or some of the buffered frames at the standard frame rate.

The use of buffering in combination with the priming mode for transitioning between the standard frame rate mode and the high frame rate mode beneficially enables the camera to encode frames at the high frame rate even for frames that were captured before the second threshold is crossed, indicating a high confidence that an event is occurring that would be desirable to capture at the high frame rate. Because there may be some delay between when the relevant event actually occurs and when the processed input data reflects a confidence value exceeding the second threshold, the camera can still ensure that the event is not missed. Furthermore, the camera can save processing power and memory resources by only encoding at the high frame rate when there is high confidence that the event of interest is occurring.

Figure 5:
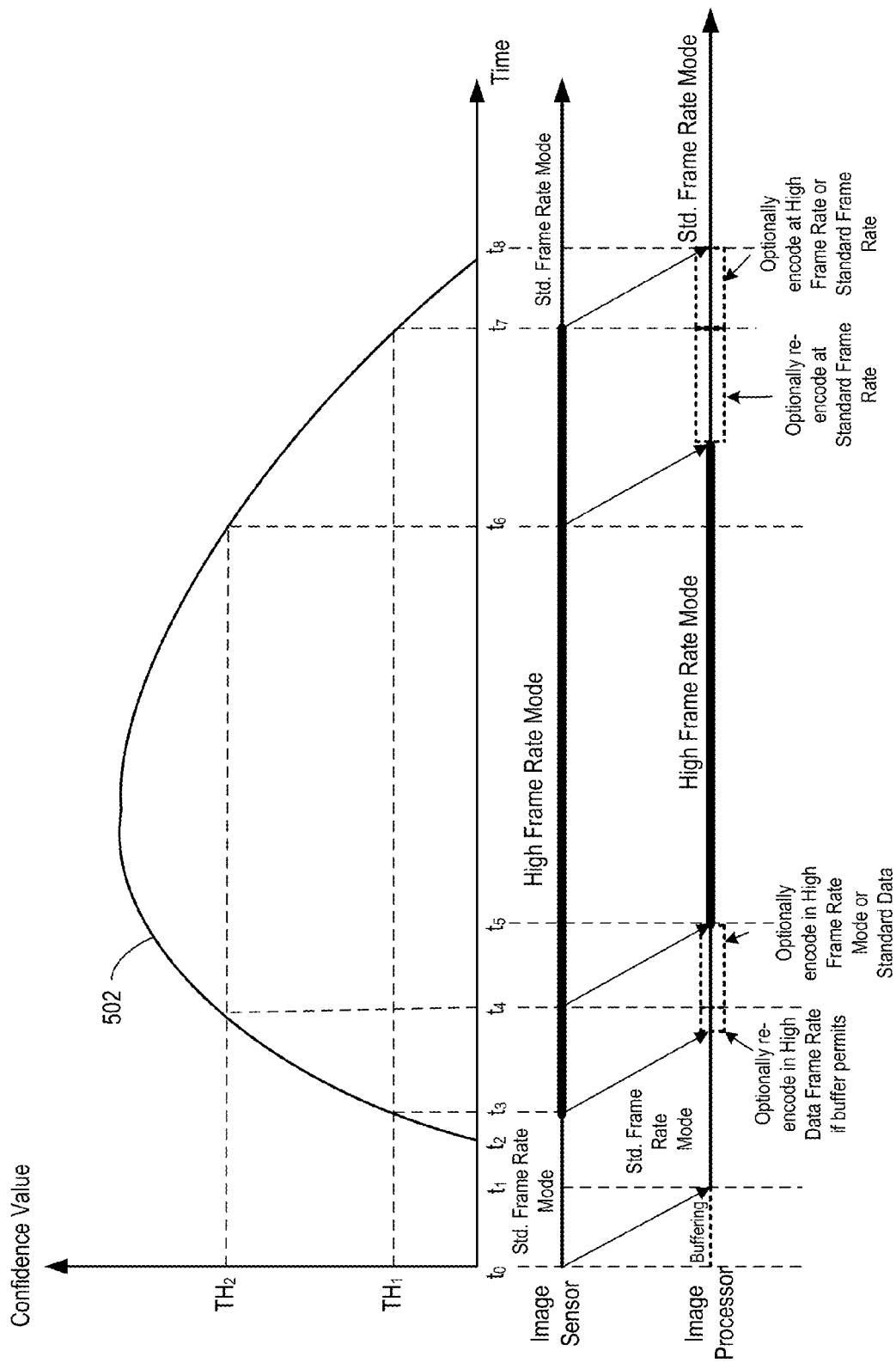
FIG. 5 is a timing diagram illustrating a camera switching between operation modes according to confidence values associated with an alternative operation mode (e.g., a high frame rate mode), according to one embodiment.

FIG. 5 is a timing diagram illustrating an example in which a camera switches between a standard frame rate mode, a priming mode, and a high frame rate mode according to confidence values associated with a likelihood of an event occurring for which it is desirable to operate a high frame rate. At time $t_0$, the camera 100 operates in the initial operation mode (e.g., a standard frame rate mode). The image sensor 114 starts capturing image data according to the standard frame rate mode. The captured image frames are buffered, for example, in an FIFO buffer. At time $t_1$, the buffer 115 becomes full and the image processor 116 begins encoding the image frames from the buffer 115, also at the standard frame rate. As can be seen, the image processor 116 lags behind the image sensor 114. Thus, for example, a frame captured at time $t_0$ is encoded at time $t_1$. The time duration $(t_1-t_0)$ is the time difference between the image sensor 114 beginning to capture and store image data in a buffer 115 and the image processor 116 beginning to encode the buffered image data from the buffer 115.

At time $t_2$, the confidence value associated with the high frame rate mode begins to increase. For example, a velocity, acceleration, pulse rate, or altitude of a skier begins to increase indicating the skier is nearing a jump. Nevertheless, because the confidence value has not yet reached the first threshold $TH_1$, the camera 100 remains operating in the initial operation mode.

At time $t_3$, the confidence value associated with the high frame rate mode reaches the first threshold $TH_1$. The camera 100 switches its operation from the initial operation mode to a priming operation mode. In the priming operation mode, the image sensor 114 switches to capture image data according to the high frame rate and stores the high frame rate data to the buffer 115. The image processor 116 continues to encode the buffered data according to the standard frame rate mode.

At time $t_4$, the confidence value associated with the event of interest reaches a second threshold $TH_2$ indicating with very high confidence that the event of interest is occurring and that it is desirable to encode this content at the high frame rate. At time $t_5$, the frames captured by the image sensor at $t_4$ are read from the buffer and encoded. Between $t_4$ and $t_5$, the image processor 116 may optionally continue to encode at the standard frame rate (so that the frames captured when the confidence value is between $TH_1$ and $TH_2$ are encoded at the standard frame rate), or the image processor 116 may encode all or some of the buffered data at the high frame rate (so that all or some of the frames captured when the confidence value is between $TH_1$ and $TH_2$ are encoded at the high frame rate). Additionally, if the time between $t_3$ and $t_4$ is longer than the buffer time, there may be some frames capturing during the priming mode that were already encoded at the standard frame rate. In this case, these frames may optionally be re-encoded (e.g., at time $t_4$) at the high frame rate if the buffer permits. In this way, frames before the high confidence threshold $TH_2$ is reached can be encoded at a high frame rate, thus ensuring that the event of interest is not missed.

At the time $t_6$, the confidence value drops below the second threshold $TH_2$. The image sensor 114 and the image processor 116 both continue to operate according to the high frame rate mode. The confidence value associated with the high frame rate mode continues to drop, and at a time $t_7$, the confidence value drops below the first threshold $TH_1$ indicating with reasonably high certainty that the event of interest is over. The image sensor 114 returns to operate according to the standard frame rate mode. The image processor 116 may continue to encode the already buffered data captured by the image sensor 114 while in the high frame rate mode until it completes encoding the buffered data at time $t_8$, or the image processor 116 may switch to encode at the standard frame rate at time $t_7$. Additionally, all or some of the frames captured between $t_6$ and $t_7$ could be optionally re-encoded at the standard frame rate after the confidence value drops below $TH_1$ and it is determined the frames captured during this time were likely after the event of interested ended, After time $t_8$, the camera returns to the initial operation mode.

Controlling Video Enhancement Feature

Figure 6:
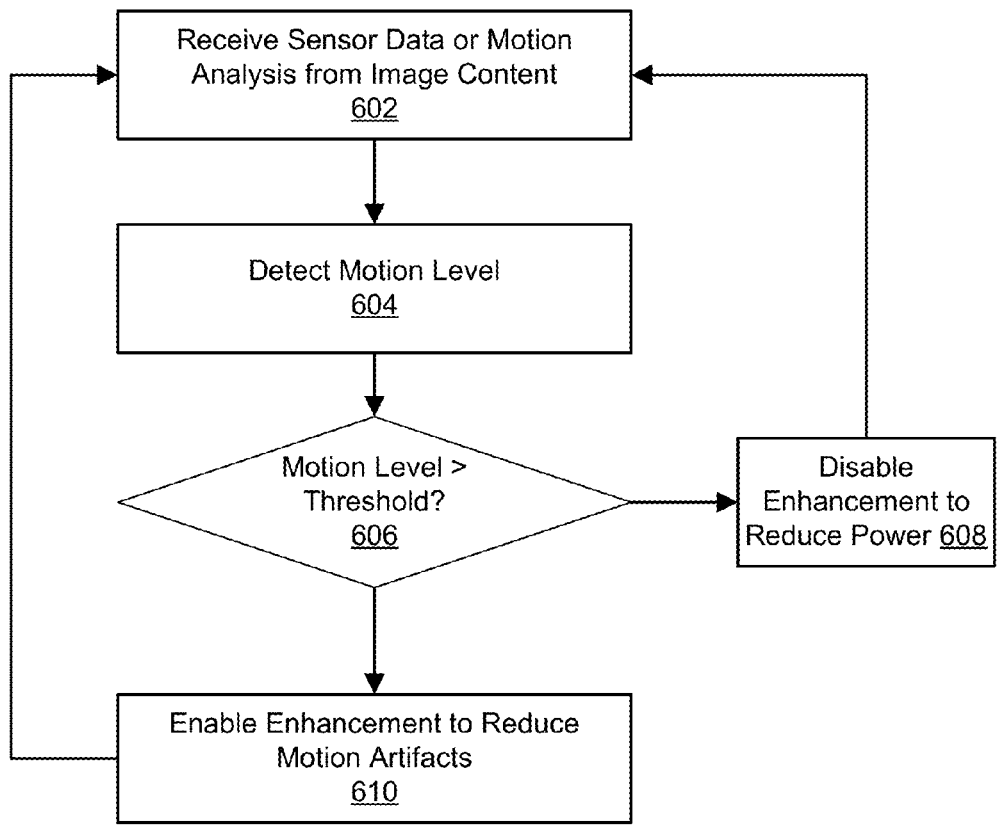
FIG. 6 is a flowchart illustrating an embodiment of a process for automatically controlling a video enhancement feature based on motion data.

In one embodiment, the confidence value in FIG. 6 may track velocity, acceleration, altitude, pulse rate, or a combination of parameters. In another embodiment, the confidence value may be set to a value between $TH_1$ and $TH_2$ in response to a first command being received via a voice, gesture, or button input, set to a value above $TH_2$ in response to confirming the command (e.g., by issuing a prompt for the user to confirm the command and the user providing an input to respond affirmatively), and set to a value below $TH_1$ in response to a second command. This embodiment enables a user to manually control the camera mode.

In another embodiment, the mode controller 180 intelligently turns on or off a video enhancement feature. For example, some features such as image stabilization or rolling shutter artifact reduction are most beneficial in videos with relatively high motion. If the motion is relatively low, these enhancements will provide little improvement to the video quality. Furthermore, because applying image stabilization, rolling shutter artifact reduction, or other enhancement algorithms can significantly increase power consumption, it may be desirable to enable these features only when they will be provide a significant improvement in quality (e.g., when motion is detected to be above a threshold level) and are otherwise disabled to reduce power.

In one example of a rolling shutter artifact reduction algorithm, video frames are captured by the image sensor 114 at a higher frame rate than the image processor 116 reads them out. For example, the image sensor 114 may capture at 120 frames per second but the image processor 116 reads at 30 frames per second, thus reading every 4 frames or combining every 4 frames into a single frame. Alternatively, the image sensor 114 may capture an image during a relatively short capture interval (e.g., equivalent to a 120 fps capture interval) and then waits for a blanking interval (e.g., the length of 3 120 fps capture intervals) before capturing the next frame. In either case, the capture time is relatively short compared to the frame rate. The shortened capture time reduces the rolling shutter artifact. An embodiment of an algorithm for reducing rolling shutter artifact is described in, for example, U.S. Pat. No. 8,830,367 which is incorporated by reference herein.

In other enhancement algorithms such as video stabilization, the image sensor 114 overcaptures a video window so that the capture frame is larger than the output view window. Motion can be then be compensated by shifting the position of the output view window opposite to the direction of detected motion.

FIG. 6 illustrates an embodiment of a process for controlling a video enhancement feature (e.g., rolling shutter artifact reduction or image stabilization) based on detected motion. Sensor data or motion analysis from the image content itself is received 602 and a motion level is detected 604. The motion level may comprise, for example, a detected velocity or acceleration of the camera relative to the scene. The motion level is compared 606 to a motion threshold. If the motion level is less than the threshold, the video enhancement feature is disabled 608 to reduce power consumption. If the motion level is greater than the threshold, the video enhancement feature is enabled 610 to reduce motion artifacts. The process may repeat to enable or disable the video enhancement feature on a frame-by-frame basis or for a range of frames.

Automatically Controlling Operation Mode of Multiple Cameras

Figure 7:
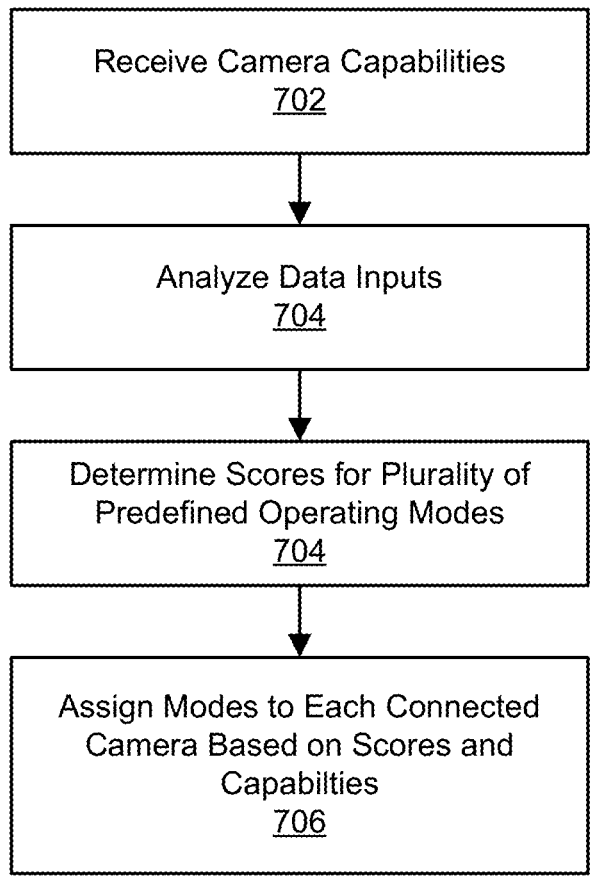
FIG. 7 is a flowchart illustrating an embodiment of a process for automatically controlling a capture mode of a plurality of different cameras.

As described earlier, in one embodiment a mode controller 180 can control the operation mode of a plurality of different cameras communicatively coupled to the mode controller 180. FIG. 7 illustrates on embodiment of a process for controlling operating modes of multiple cameras. The mode controller 180 receives 702 the capabilities of each of the connected cameras. For example, the mode controller 180 may determine what resolutions and frame rates each camera is capable of operating at. Furthermore, the mode controller 180 may determine how many image processors 116 and image sensors 114 are available at each camera. The mode controller 180 analyzes 704 input data (e.g., sensor data, image/audio data, control input data, etc.) and determines 706 a score for each of a plurality of predefined operating modes. The scores may be computed, for example, based equations or a set of rules that map the set of inputs to a score for each predefined mode indicating how desirable that operation mode is given the input parameters. The mode controller 180 generates a ranked list of operating modes ordered based on their scores. For example, the mode controller 180 may determine that a 1080 p resolution 120 fps video is a first preferred operation mode, a 1/30 burst picture is a second preferred operation mode, and a 4 kp resolution 30 fps video is a third preferred operation mode. The mode controller 180 then assigns the camera modes to each of the connected cameras based on their capabilities. For example, starting with the first preferred operating mode, the mode controller 180 determines if a camera is available that is capable of operating in that mode, and if so, assigns the camera to that mode. The mode controller 180 then similarly assigns the second preferred operating mode to another camera if available and capable of operating in the mode. In some embodiments, and integrated camera system (e.g., a spherical camera) may include a different number of image sensors 114 and image processors 116 (e.g., two image sensors 114 linked to a single image processor 116). In these cases, the mode controller 180 may assign operating modes to the image sensors 114 and image processors 116 separately within a single camera. For example, one image processor may be configured to encode at a high frame rate while the other is configured to encode a low frame rate.

The technique of FIG. 7 beneficially enables multiple cameras to be configured in different modes to capture an event according to more than one set of capture parameters instead of each camera independently capturing the event with the same parameters. For example, when going over a ski jump, it may be desirable to capture the jump with both high frame rate video and a burst image capture. This enables the user to determine in post-processing which capture is most desirable or lets the user combine footage from a combination of different captures from different cameras.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment.

The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

What is claimed is:

1. A method for controlling operation of a camera, comprising:

receiving, from one or more sensors of the camera, sensor data;

determining a confidence value associated with an alternative operation mode for operating the camera based at least in part on the received sensor data, the confidence value indicating a likelihood of the alternative operation mode being preferred by a user to capture an event;

while the camera is operating in an initial operation mode in which an image sensor captures images according to an initial capture mode and an image processor reads the captured images from a buffer of the camera and encodes the captured images according to an initial encoding mode:

responsive to determining that the confidence value exceeds a first threshold, transitioning the camera to a priming operation mode in which the image sensor captures images according to an alternative capture mode and the image processor reads the captured images from the buffer of the camera and encodes the captured images according to the initial encoding mode; and while the camera is operating in the priming operation mode, responsive to determining that the confidence value subsequently exceeds a second threshold greater than the first threshold, transitioning the camera to the alternative operation mode in which the image sensor captures images according to the alternative capture mode and the image processor reads the captured images from the buffer of the camera and encodes the captured images according to an alternative encoding mode.

2. The method of claim 1, further comprising:

while the camera is operating in the priming operation mode, responsive to determining that the confidence value subsequently drops below the first threshold, transitioning the camera to the initial operation mode.

3. The method of claim 1, wherein transitioning the camera to the alternative operation mode comprises:

encoding, by the image processor according to the initial encoding mode, images already stored in the buffer that were captured by the image sensor with the camera operating in the priming mode; and after the image processor encodes the captured images from the buffer, transitioning the image processor to operate in the alternative encoding mode.

4. The method of claim 1, wherein transitioning the camera to the alternative operation mode comprises:

encoding, by the image processor according to the alternative encoding mode, at least a subset of images already stored in the buffer that were captured by the image sensor with the camera operating in the priming mode; and after the image processor encodes the images from the buffer, operating the image processor in the alternative encoding mode.

5. The method of claim 1, further comprising:
while the camera is operating in the alternative operation mode, responsive to determining that the confidence value subsequently drops below the first threshold, transitioning the camera to the initial operation mode.

6. The method of claim 5, wherein transitioning the camera to the initial operation mode comprises:
encoding, by the image processor according to the alternative encoding mode, images already stored in the buffer that were captured by the image sensor with the camera operating in the alternative mode; and
after the image processor encodes the images from the buffer, transitioning the image processor to operate in the initial encoding mode.

7. The method of claim 5, wherein transitioning the camera to the initial operation mode comprises:
encoding, by the image processor according to the initial encoding mode, at least a subset of images already stored in the buffer that were captured by the image sensor with the camera operating in the priming mode; and
after the image processor encodes the images from the buffer, operating the image processor in the initial encoding mode.

8. The method of claim 1, further comprising:
determining confidence values for each of a set of predefined operation modes;
ranking a set of predefined operation modes according to the associated confidence values; and
determining the alternative operation mode having a highest confidence value.

9. The method of claim 8, further comprising:
identifying a first quantity of image sensors that are available and a second quantity of image processors that are available; and
determining the set of predefined operation modes for the camera based at least in part on the first quantity and the second quantity.

10. The method of claim 1, wherein the camera transitions to the priming operation mode at a first time point, further comprising: while the camera is operating in the priming operation mode, transitioning the camera to the alternative operation mode at a second time point later than the first time point by a predetermined duration.

11. The method of claim 1, wherein the camera transitions to the priming operation mode at a first time point, further comprising: while the camera is operating in the priming operation mode, responsive to determining the confidence value subsequently is greater than the first threshold but below the second threshold, transitioning the camera to the initial operation mode at a second time point later than the first time point by a predetermined duration.

12. The method of claim 1, wherein the confidence value associated with the alternative operation mode for operating the camera is determined by providing the received sensor data to a classifier that is trained to evaluate correlations between the received sensor data and a set of alternative operation modes.

13. A camera, comprising:
one or more sensors to generate sensor data;
an image sensor to capture images according to different capture modes including an initial operation mode and an alternative operation mode;
a buffer to store the captured images;
an image processor to read the captured images from the buffer and to encode the captured images according to different encoding modes including an initial encoding mode and an alternative encoding mode; and
a mode controller to:
receive the sensor data from the one or more sensors;
determine a confidence value associated with an alternative operation mode for operating the camera based at least in part on the received sensor data, the confidence value indicating a likelihood of the alternative operation mode being preferred by a user to capture an event;
while the camera is operating in an initial operating mode in which the image sensor captures images according to the initial capture mode and the image processor reads the captured images from the buffer and encodes the captured images according to the initial encoding mode, responsive to determining that the confidence value exceeds a first threshold, transition the camera to a priming operation mode in which the image sensor captures images according to the alternative capture mode and the image processor reads the captured images from the buffer and encodes the captures images according to the initial encoding mode; and
while the camera is operating in the priming operation mode, responsive to determining that the confidence value subsequently exceeds a second threshold greater than the first threshold, transition the camera to the alternative operation mode in which the image sensor captures images according to the alternative capture mode and the image processor reads the captured images from the buffer of the camera and encodes the captured images according to an alternative encoding mode.

14. The camera of claim 13, wherein the mode controller is further configured to:
while the camera is operating in the priming operation mode, responsive to determining that the confidence value subsequently drops below the first threshold, transition the camera to the initial operation mode.

15. The camera of claim 14, wherein transitioning the camera to the alternative operation mode comprises:
encoding, by the image processor according to the initial encoding mode, images already stored in the buffer that were captured by the image sensor with the camera operating in the priming mode; and
after the image processor encodes the captured images from the buffer, transitioning the image processor to operate in the alternative encoding mode.

16. The camera of claim 14, wherein transitioning the camera to the alternative operation mode comprises:
encoding, by the image processor according to the alternative encoding mode, at least a subset of images already stored in the buffer that were captured by the image sensor with the camera operating in the priming mode; and
after the image processor encodes the images from the buffer, operating the image processor in the alternative encoding mode.

17. The camera of claim 14, wherein the mode controller is further configured to:
while the camera is operating in the alternative operation mode, responsive to determining that the confidence value subsequently drops below the first threshold, transitioning the camera to the initial operation mode.

18. The camera of claim 17, wherein transitioning the camera to the initial operation mode comprises:
encoding, by the image processor according to the alternative encoding mode, images already stored in the buffer that were captured by the image sensor with the camera operating in the alternative mode; and
after the image processor encodes the images from the buffer, transitioning the image processor to operate in the initial encoding mode.

19. The camera of claim 17, wherein transitioning the camera to the initial operation mode comprises:
encoding, by the image processor according to the initial encoding mode, at least a subset of images already stored in the buffer that were captured by the image sensor with the camera operating in the priming mode; and
after the image processor encodes the images from the buffer, operating the image processor in the initial encoding mode.

20. The camera of claim 13, wherein the mode controller is further configured to:
determine confidence values for each of a set of predefined operation modes;
rank a set of predefined operation modes according to the associated confidence values; and
determine the alternative operation mode having a highest confidence value.

21. The camera of claim 20, wherein the mode controller is further configured to:
identify a first quantity of image sensors that are available and a second quantity of image processors that are available; and
determine the set of predefined operation modes for the camera based at least in part on the first quantity and the second quantity.

22. The camera of claim 13, wherein the camera transitions to the priming operation mode at a first time point and the mode controller is further configured to: while the camera is operating in the priming operation mode, transition the camera to the alternative operation mode at a second time point later than the first time point by a predetermined duration.

23. The camera of claim 13, wherein the camera transitions to the priming operation mode at a first time point and the mode controller is further configured to: while the camera is operating in the priming operation mode, responsive to determining the confidence value is subsequently greater than the first threshold but below the second threshold transition the camera to the initial operation mode at a second time point later than the first time point by a predetermined duration.

24. The camera of claim 13, wherein the confidence value associated with the alternative operation mode for operating the camera is determined by providing the received sensor data to a classifier that is trained to evaluate correlations between the received sensor data and a set of alternative operation modes.

25. A camera, comprising:
one or more sensors;
a processor; and
a non-transitory memory coupled to the processor and storing instructions configured to cause the processor to:
receive, from the one or more sensors of the camera, sensor data;
determine a confidence value associated with an alternative operation mode for operating the camera based at least in part on the received sensor data, the confidence value indicating a likelihood of the alternative operation mode being preferred by a user to capture an event;
while the camera is operating in an initial operation mode in which an image sensor captures images according to an initial capture mode and an image processor reads the captured images from a buffer of the camera and encodes the captured images according to an initial encoding mode:
responsive to determining that the confidence value exceeds a first threshold, transition the camera to a priming operation mode in which the image sensor captures images according to an alternative capture mode and the image processor reads the captured images from the buffer of the camera and encodes the captured images according to the initial encoding mode; and
while the camera is operating in the priming operation mode, responsive to determining that the confidence value subsequently exceeds a second threshold greater than the first threshold, transition the camera to the alternative operation mode in which the image sensor captures images according to the alternative capture mode and the image processor reads the captured images from the buffer of the camera and encodes the captured images according to an alternative encoding mode.

* * * * *